United States Patent [19]
Wagner et al.

[11] Patent Number: 5,466,742
[45] Date of Patent: Nov. 14, 1995

[54] AQUEOUS OUTSIDE RELEASE AGENT COMPRISING DIATOMACEOUS EARTH AND PYROGENIC HYDROPHOBIC SILICA FOR MOLDING AND VULCANIZING TIRES AND OTHER RUBBER ARTICLES

[75] Inventors: Herbert Wagner, Bad Schönborn; Karl-Heinrich Schuhmacher, St. Leon, both of Germany

[73] Assignee: Rhein Chemie Rheinau GmbH, Mannheim, Germany

[21] Appl. No.: 182,451

[22] Filed: Jan. 14, 1994

Related U.S. Application Data

[63] Continuation of Ser. No. 891,397, May 29, 1992, abandoned.

[30] Foreign Application Priority Data

Jun. 4, 1991 [DE] Germany .................. 41 18 234.0

[51] Int. Cl.$^6$ .................. C08J 5/10; C08K 3/34; C08L 25/14
[52] U.S. Cl. .................. 524/448; 524/389; 524/442; 524/496; 524/493; 524/318; 524/25; 524/31; 524/35; 106/124; 106/146; 106/148; 106/161; 106/203; 106/204
[58] Field of Search .................. 524/389, 442, 524/448, 496, 493, 318, 25, 31, 35; 106/124, 146, 148, 161, 203, 204

[56] References Cited

U.S. PATENT DOCUMENTS

| | | | |
|---|---|---|---|
| 4,325,852 | 4/1982 | Hallenbeck | 523/334 |
| 4,329,265 | 5/1992 | Hallenbeck et al. | 524/496 |
| 4,666,518 | 5/1987 | Hallenbeck et al. | 106/38.25 |
| 5,134,170 | 7/1992 | Ohata et al. | 521/82 |

FOREIGN PATENT DOCUMENTS

| | | |
|---|---|---|
| 1064683 | 12/1970 | Germany . |
| 1604683 | 12/1970 | Germany . |
| 2925662 | 1/1981 | Germany . |

*Primary Examiner*—Paul R. Michl
*Assistant Examiner*—U. K. Rajguru
*Attorney, Agent, or Firm*—Connolly & Hutz

[57] ABSTRACT

An aqueous outside release agent for the production of tires and other rubber articles is described, which contains 5 to 35% by wt. diatomaceous earth, 0.5 to 6% by wt. pyrogenic hydrophobic silica, 0.1 to 2% by wt. nonionic surfactant, 0.2 to 3% by wt. of a binder, 0.1 to 3% by wt. dye, 0 to 5% by wt. ethyl alcohol and the remainder water. Preferred binders are styrene-maleic acid or styrene-maleic anhydride copolymers and in particular ammonium salts thereof. Said outside release agent is used in processes for molding and vulcanizing tires and other rubber articles, it being sprayed onto the blank with the aid of air-atomizing guns before molding and vulcanization are carried out. A very good release effect is thereby achieved without vulcanization being impaired. As only very small quantities of outside release agent are needed, cleaning of the press mold and hence interruption of the production process are required very much less frequently than when conventional outside release agents are used.

23 Claims, No Drawings

AQUEOUS OUTSIDE RELEASE AGENT COMPRISING DIATOMACEOUS EARTH AND PYROGENIC HYDROPHOBIC SILICA FOR MOLDING AND VULCANIZING TIRES AND OTHER RUBBER ARTICLES

This is a continuation of application Ser. No. 07/891,397 filed May 29, 1992, now abandoned.

The invention relates to an aqueous outside release agent for the production of tires and other rubber articles and to a process for molding and vulcanising tires and other rubber articles using said aqueous outside release agent.

According to the state of the art, tires are molded and vulcanised by introducing the tire blanks into a spray cabin in which they are rotated by means of mechanical devices. Into said blanks is introduced a spray gun with which a release agent solution is distributed on the inside of the blanks. In many existing tire production plants it is also necessary to use a release agent between the outside of the tire blank and the metal mold of the vulcanisation process, known as an outside release agent. The application of release agent to the inside and the outside of the tire blank is usually one operation.

The overspray is removed by vacuum or a water wall. Molding and vulcanisation of the blank then takes place in a vulcanisation press by means of a heating membrane (bladder), the purpose of which is to heat the tire blank, bring about vulcanisation and press the tire at high pressure in negative molds (compare the description of this method of operating in DE-PS 29 25 662, DE-OS 31 46 053, and in particular, the introduction of the description of the published European patent application 0 111 100).

The inside and outside spray solutions used as release agent in this method of operating usually consist of benzinous solutions of release effective substances which contain mineral fillers and have a benzine content or a total organic solvents content of the order of magnitude of 70% by wt. and above. Conventional outside spray solutions which can be applied with air-atomizing guns according to the airmix process or the airless process have, for example, the following composition:

| | |
|---|---|
| Benzine (boiling range 100°–120° C.) | 70–90% by wt. (preferably 80–85% by wt.) |
| Alcohol (ethyl alcohol) | 4–5% by wt. (or less) |
| Talcum or other fillers | 4–7% by wt. |
| Carbon black | 6–10% by wt. |
| Natural rubber | 2–7% by wt. |
| Stearic acid | 1–2% by wt. |

These outside spray solutions are applied in a quantity of 30–80 g and in particular approximately 60 g per standard passenger vehicle tire.

It is obvious that these release agent solutions are harmful to the environment or require a very large amount of expenditure on equipment in order to avoid environmental pollution. Consequently, aqueous release agent solutions have also already been proposed, but have hitherto proved effective only as inside release agents. As a result, aqueous inside spray solutions and benzinous outside spray solutions are being used in many tire production plants. As the overspray and those quantities of spray solution that do not remain on the blank flow away or are removed together, however, there arises as waste product a mixture of aqueous and benzinous spray solutions which represents special waste. The same applies when heating membranes coated with a permanent film of release agent are used which render the use of inside spray solutions superfluous. There is, therefore, an urgent need for an effective aqueous outside release agent so that the advantages that can be achieved with the already proven aqueous inside release agents or heating membranes coated with a permanent film of release agent can actually be effective and the treatment of the tire blanks with release agent can be made altogether more environmentally acceptable.

The invention was therefore based on the aim of proposing an environmentally acceptable aqueous outside release agent for the production of tires and other rubber articles and a process for molding and vulcanising tires and other rubber articles which avoid the above-mentioned disadvantages of the prior art and allow the use of existing production plants without major changes.

In order to achieve said aim, an aqueous release agent is proposed for the production of tires and other rubber articles which comprises A) 5 to 35% by wt. and preferably 7.5 to 15% by wt. diatomaceous earth, B) 0.5 to 6% by wt. and preferably 1 to 3% by wt. pyrogenic hydrophobic silica, C) 0.1 to 2% by wt. and preferably 0.2 to 0.7% by wt. nonionic surfactant, D) 0.2 to 3% by wt. and preferably 0.4 to 2% by wt. of a binder selected from
  a) polymers and salts thereof containing carboxyl radicals and preferably also aryl radicals, where carboxyl radicals must be present in at least such quantity that the polymers are able to form water-soluble salts,
  b) esters, dispersed in water, of the polymers according to a),
  d) casein and/or albumin dissolved in water,
  e) cellulose and
  f) mixtures of two or more binders according to a)–d), E) 0.1 to 3% by wt. and preferably 0.3 to 1% by wt. dye, F) 0 to 5% by wt. and preferably 3 to 5% by wt. ethyl alcohol, and G) the remainder and preferably 45 to 90% by wt. water.

The subject of the invention is, moreover, a process for molding and vulcanising tires and other rubber articles, in which negative molds are pressed into the blank at high pressure in a press with the aid of a heating membrane and vulcanisation is brought about, which is characterised in that, before molding and vulcanising are carried out, the blank is sprayed on the outside with the outside release agent according to the invention and the water contained therein is allowed to evaporate, to form a release agent film.

Preferred embodiments of the outside release agent according to the invention and of the process according to the invention will become apparent from the subclaims and the following description in which the invention is explained on the basis of tire production, though the details are also valid for the production of other rubber articles or are applicable hereto.

The requirements to be met by an outside release agent for the production of tires and other rubber articles are diverse. A good deairing effect, easy removal from the press, little contamination of the press in order to avoid frequent cleaning operations, no adverse effect on vulcanisation, i.e. in particular absence of silicone, low solids content remaining on the tire, good spray properties and short drying time after spraying onto the tire blank and no adverse effects on the outside (finish) of the completed tire can be mentioned in particular. Moreover, the outside release agent should, if possible, be stable in storage and, in the event of solids settling, be capable of being rendered usable again by simple stirring. Surprisingly, it has become apparent that all these requirements can be met in an excellent manner with the outside release agent according to the invention. It is particularly surprising that with outside release agents with a high water content, skin formation after application to the outside of the tire blank is largely absent so that in view of the large surface area present, rapid evaporation of the water takes place and hence a rapid formation of the desired release agent film.

The diatomaceous earth used according to the invention naturally has a high porosity and is used in the form of a finely divided powder, it being preferable for the particles predominantly to have a size (Coulter Counter) of 2 to 40 µm. A suitable product obtainable commercially has, for example, a particle size distribution in which 4% to 6% of the particles have a size of 20 to 40 µm, 20% to 30% of the particles have a size of 10 to 20 µm, 32% to 40% of the particles have a size of 6 to 10 µm and 35% to 52% of the particles have a size of 2 to 6 µm. Larger and smaller particles are present in said product only in traces.

The diatomaceous earth content of the aqueous outside release agent according to the invention is 5 to 35% by wt. and preferably 7.5 to 15% by wt.

The diatomaceous earth used according to the invention is an active filler which is well compatible with the tire rubber and during vulcanization penetrates into the tire. Thus it has been found that diatomaceous earth can be completely or partially replaced by another active filler, namely silica. Suitable are for example precipitated silicas. As an example the commercially available precipitated silicas SIPERNAT® 22 LS and D 17 can be mentioned. Suitable are also other silicas like pyrogenic silicas with low BET surface and thus increased particle size (secondary particles) in the range above stated for diatomaceous earth. As an example Aerosil® OX 50 can be mentioned in this context.

As pyrogenic hydrophobic silica (component B) the products obtainable commercially such as AEROSIL® can be used which are well known as active fillers and do not affect vulcanisation. Said pyrogenic silicas modified by surface treatment have a BET surface area of about 50 to 200 m$^2$/g and in particular about 90 to 130 m$^2$/g. The mean size of the primary particles is usually in the range of 10 to 20 nm. The proportion of pyrogenic hydrophobic silica in the outside release agent according to the invention is 0.5 to 6% by wt. and preferably 1 to 3% by wt.

The choice of a suitable surfactant requires particular care because vulcanisation can be very substantially impaired by surfactants, this being reflected in an obviously unacceptable coming apart in the region of the tire seam, side walls, tread and bead. Even a few parts per thousand of certain surfactants can lead to problems of this kind. Within the framework of the invention, nonionic surfactants have proved to be suitable. Polyalkylene glycols based on block polymers of ethylene oxide and propylene oxide are used in preference, which are obtainable for example under the name "Pluronic"®. Well suited are further ethoxylates like TRITON® X-100 (octylphenoxy-polyethoxyethanol with 10 moles ethylene oxide on an avarage) and MARLIPAL® 013/50 (C$_{13}$-oxoalcohol plus 5 moles ethylene oxide). The proportion of surfactant should be 0.1 to 2% by wt. and preferably 0.2 to 0.7% by wt.

The binders used according to the invention give strength to the release agent film forming and lead preferably to the formation of a non-thermoplastic film which can withstand temperatures of up to 200° C. for a short time. The non-thermoplastic nature of the release agent film is important for the deairing required when carrying out molding and vulcanisation because thermoplastic release agent films smear under the harsh conditions of molding and vulcanisation and can thereby trap air. This in turn would lead to defects on the tire surface. When choosing the binder it should also be borne in mind how quickly drying must take place after the outside release agent has been sprayed onto the tire blank. The drying time required in each case depends on the cycle times of the particular production plant.

In particular, sizes well known from paper manufacture have proved to be suitable as binders. These are polymers containing carboxyl radicals and preferably aryl radicals where carboxyl radicals must be present in at least such quantity that the polymers are able to form water-soluble salts. Said polymers are preferably copolymers of vinyl aromatics and short-chain unsaturated carboxylic acids, particularly dicarboxylic acids. Copolymers of styrene and maleic acid or maleic anhydride, acrylic acid and methacrylic acid are particularly preferred. Whether said polymers are used as such or in the form of their salts will depend essentially on the drying times to be achieved.

The styrene-maleic acid or maleic anhydride copolymers or salts thereof preferred according to the invention are well known paper sizes (e.g. DARASIZE 942® and BAYSYNTHOL ASP®). They are used preferably in the form of ammonium salts and in particular as approximately 20% solutions in water. Copolymers containing carboxyl groups which contain other comonomers e.g. diisobutylene instead of vinyl aromatics are also suitable. Again, the ammonium salts obtainable commercially in the form of aqueous solutions (e.g. salts obtainable commercially in the form of aqueous solutions (e.g. BAYSYNTHOL AL 2®) are preferred.

It is also possible to use esters of the polymers described above. If there are no problems of disposal, it is possible, for example, to use acrylic ester-styrene-copolymers such as copolymers of n-butyl acrylate and styrene which are well known, for example, for the production of adhesives of all kinds, paints, resin-bonded plasters and mastics and as binders for non-wovens and textile coatings (e.g. ACRONAL® 290 D). Esters of this kind are normally non water-soluble and therefore have to be dispersed in water. Such aqueous dispersions are obtainable commercially (e.g. ACRONAL® 290 D mentioned above and BASOPLAST® 400 DS).

Moreover, casein and/or albumin dissolved in water can be used as binder. To this end, commercially obtainable acid casein (powder), for example, is solubilized with borax or ammonia so that 10 to 20% solutions with a pH of 6.5 to 6.8 are usually obtained. Initially, a charge of water is heated to 40° to 50° C. The acid casein powder is then stirred in. Borax is then added until a pH of 6.5 to 6.8 is obtained. A solution prepared in this way contains, for example, 77.9% by wt. water, 19.5% by wt. casein and 2.6% by wt. borax. If solubilization is carried out with ammonia, the procedure is the same and the ammonia can be added in the gaseous form or in the form of an aqueous solution (10 to 35%). The aqueous albumin solutions are prepared in a corresponding manner.

Finally, cellulose can also be used as binder. The commercially obtainable aqueous solutions of cold-dissolved cellulose are used for this purpose.

The outside release agent according to the invention contains the binder in a quantity of 0.2 to 3% by wt., preferably 0.4 to 2% by wt., whereby, if aqueous dispersions of binder are used, these details do not include their water content and any auxiliaries such as dispersing agents.

If rapid drying of the film of release agent is required, it is preferable to use the ammonia-containing binder or binders present in the form of ammonium salts because ammonia escapes very rapidly from the release agent film forming and thereby promotes rather than impedes drying. Apart from the environmental disadvantages of some of the binders that can be used according to the invention, aqueous solutions of ammonium salts of styrene-maleic acid or styrene-maleic anhydride copolymers are therefore particularly preferred.

The dyes used according to the invention are present preferably in powder form. Within the context of tire production in particular, black pigments based on carbon black are normally preferred. Care should be taken to ensure that the pigment used can be dispersed well in water. Suitable products are obtainable commercially and standardised according to the Colour Index. The pigment Black 7 can be mentioned here in particular. As a rule, 0.1 to 3% by wt. and preferably 0.3 to 2% by wt. dye are used.

In particularly preferred embodiments, the water content is more than 75 and frequently even more than 85% by wt. Moreover, the ethyl alcohol proportion can be increased if the removal of overspray is not important. As a result, the drying time of the outside release agent after being sprayed onto the tire blank can be reduced further. The ethyl alcohol proportion can be increased to 30% by wt. in this case.

In order to improve the stability of the outside release agent according to the invention, 0.3 to 2% by wt. and preferably 0.5 to 1% by wt. pyrogenic hydrophilic silica are often added as stabiliser. The stabilising effect of hydrophilic silica is well known and consequently such silicas are offered on the market by various producers (e.g. AEROSIL® 200). The surface area and particle sizes are similar to those of the hydrophobic silica described above.

In addition it has proven favorable that the outside release agent according to the invention contains 0.1 to 1.5% by wt. and preferably 0.3 to 1% by wt. ammonium stearate as additional component. Ammonium stearate functions as surface improver and promotes heat-sealing due to its vulcanization friendliness.

Finally the properties of the outside release agent according to the invention can be additionally improved by the use of ethanol amines, particularly triethanol amine. The ethanol amines provide an increase or adjustment of the pH value to 7.5 to 10 and preferably 8.0 to 9.5. This lowers the viscosity of the outside release agent according to the invention to a well pumpable level. In general the desired effect is achieved with 0.1 to 1% by wt. ethanol amine.

The application of the aqueous outside release agent according to the invention onto the blank takes place with the aid of air-atomizing guns (e.g. under high pressure in the range of 6 bar). Low pressure systems (1 to 2 bar) e.g. diaphragm pumps can be used as feed pumps. This is an advantage over the prior art described above which requires the use of high pressure pumps.

The outside release agent according to the invention is so effective that a total application of 10 to 25 g (1.6 to 4 g solids) per standard passenger vehicle tire is sufficient. This means not only a substantial material saving but also a great reduction in the solid remaining on the completed tire, which is obviously advantageous for the finish or further processing of the tire.

If the preferred ammonium salts of styrene-maleic acid or styrene-maleic anhydride copolymers are used, drying times of approximately 15 seconds or even less are achieved in industrial automatically operating plants. In said plants, dried air is usually used with rapid air circulation. Moreover, the air current is adjusted to the required drying time by being directed onto the tires. There are, however, also plants in which more time is available for drying (e.g. approximately 2 minutes). In these cases, the other binders suitable according to the invention (for example, copolymers and salts other than ammonium salts) can also be used.

Apart from the special cases explained above, the overspray can be disposed of by means of normal sewage plants if the outside release agent according to the invention is used, which represents another considerable advantage of the outside release agent according to the invention in comparison with the prior art.

Moreover, it has become apparent that if the aqueous outside release agent according to the invention is used, in view of the smaller amount of substance, the production process need be interrupted less often than is the case if the well known outside release agents are used. The latter require side cleaning with rotating wire brushes in the press after approximately every 250 moldings. After 2500 to 3000 moldings a thorough cleaning is necessary, to which end the mold must be dismantled and then cleaned by blasting with glass beads. Production is interrupted for 6 to 8 hours as a result. In contrast, if the outside release agent according to the invention is used, side cleaning of the mold with rotating wire brushes is necessary only after approximately every 2000 to 3000 moldings, and 16500 and more moldings can be carried out without the production process having to be interrupted in order to clean the press (dismantle the mold).

Finally, it should be mentioned that the outside release agent according to the invention contains exclusively vulcanisation-friendly constituents so that there are no problems as regards coming apart in the region of the tire seam, side walls, tread and bead.

EXAMPLE 1

Conventional passenger vehicle tires were produced in a double press. During this process a conventional outside spray solution with a composition according to the details in the introduction of the description was used in one press and an outside release agent according to the invention was used in the other press. Application took place by spraying the tires manually with the spray solution according to the invention or by means of an automatic spray device with conventional outside release solution. The outside release agent according to the invention contained (12% by wt. diatomaceous earth, 1.5% by wt. pyrogenic hydrophobic silica, 0.4% by wt. hydrophilic silica, 0.35% by wt. Pluronic PL 9200, 0.8% by wt. ammonium salt of styrene-maleic anhydride copolymer (4% by wt. of a 20% solution in $H_2O$; DARASIZE® 942), 0.51% by wt. dye based on carbon black pigments (1.7% by wt. of a 30% dispersion in glycol), 3% by wt. ethyl alcohol and the remainder water.

The conventional outside release agent was used in a quantity of 60 to 65 g per tire, whilst the outside release agent according to the invention was used in a quantity of 18 to 22 g per tire. In the case of the conventional release agent, side cleaning with rotating wire brushes had to be carried out in the press after every 250 moldings. In the case of the release agent according to the invention, such cleaning was required only after every 2000 to 3000 moldings. After 2800 moldings, the mold had to be dismantled in order to be cleaned thoroughly by blasting with glass beads when the conventional release agent was used. In contrast, such an interruption in the production process was not yet required even after more than 16500 moldings when the outside release agent according to the invention was used.

The tires produced with the outside release agent according to the invention were of very good quality, i.e. the finish of the tires was better than standard. Particularly the color markings could be identified much better.

EXAMPLE 2

An outer release agent was prepared which contained 12% by wt. diatomaceous earth, 2.45% by wt. pyrogenic hydrophobic silica, 0.38% by wt. MARLIPAL® 013/50, 2% by wt. DARASIZE® 942 (see Example 1), 0.58% by wt. dye based on carbon black pigments (1.94% by wt. of a 30% dispersion in glycol), 0.3 by wt. ammonium stearate, 3.52% by wt. ethyl alcohol and the remainder water. With this outside release agent 500 tires were produced in a test press. The results were excellent.

EXAMPLE 3

An outer release agent according to the invention was prepared which contained 6% by wt. precipitated silica (SIPERNAT 22 LS), 2% by wt. pyrogenic hydrophobic silica, 0.38% by wt. MARLIPAL 013/50, 2% by wt. DARASIZE® 942 (see Example 1), 3.7% by wt. ethyl alcohol, 0.58% by wt. dye based on carbon black pigments (1.94% by wt. of a 30% dispersion in glycol), 0.3% by wt. ammonium stearate and the remainder water. Also with this outside release agent 500 tires were produced in a test press. Again, very good results were obtained.

We claim:

1. Aqueous outside release agent for the production of tires and other rubber articles, comprising
   A) 5 to 35% by wt. diatomaceous earth,
   B) 0.5 to 6% by wt. pyrogenic hydrophobic silica,
   C) 0.1 to 2% by wt. nonionic surfactant,
   D) 0.2 to 3% by wt. of a binder selected from the group consisting of:
      a) polymers and salts thereof comprising carboxyl radicals in an amount sufficient to render said polymers or salts thereof water-soluble,
      b) esters, dispersed in water, of the polymers according to a),
      c) casein, albumin, or a combination thereof dissolved in water,
      d) cellulose and
      e) mixtures of two or more binders according to a)-d),
   E) 0.1 to 3% by wt. dye,
   F) 0 to 5% by wt. ethyl alcohol, and
   G) the remainder water.

2. Outside release agent according to claim 1, wherein the surfactant is a polyalkylene glycol based on block polymers of ethylene oxide and propylene oxide or an ethoxylate of octylphenol with 10 moles ethylene oxide on an avarage or an ethoxylate of $C_{13}$ oxoalcohol with 5 moles ethylene oxide on an avarage.

3. Outside release agent according to claim 1, wherein the binder is a copolymer of vinyl aromatics and short-chain unsaturated carboxylic acids, particularly dicarboxylic acids, or a salt thereof.

4. Outside release agent according to claim 3, wherein the binder is a styrene-maleic acid or a styrene-maleic anhydride copolymer or a salt thereof.

5. Outside release agent according to claim 4, wherein the salt of the copolymer is an ammonium salt.

6. Outside release agent according to claim 1, wherein the dye is carbon black.

7. Outside release agent according to claim 1, further comprising 0.3 to 2% by wt. pyrogenic hydrophilic silica as stabiliser.

8. Outside release agent according to claim 1, wherein the diatomaceous earth is completely or partially replaced by silica.

9. Outside release agent according to claim 1, further comprising 0.1 to 1.5% by wt. ammonium stearate.

10. Outside release agent according to claim 1, further comprising one or more ethanol amines, particularly triethanol amine, in such an amount that the pH is 7.5 to 10.

11. Outside release agent according to claim 10, wherein the pH is 8.0 to 9.5.

12. Outside release agent according to claim 10, comprising 0.1 to 1% by wt. ethanol amines, particularly triethanol amine.

13. Process for molding and vulcanising tires and other rubber articles in which negative molds are pressed, in a press, into the blank under high pressure with the aid of a heating membrane and vulcanisation is brought about, characterised in that, prior to molding and vulcanisation the blank is sprayed on the outside with an outside release agent according to one of claims 1 to 12 and the water contained therein is allowed to evaporate to form a release agent film.

14. Process according to claim 13, wherein the outside release agent is sprayed with the aid of air-atomizing guns.

15. Process according to claim 13, characterized in that 10 to 25 g of the outside release agent are used per standard passenger vehicle tire.

16. Outside release agent according to claim 1, wherein said polymers and salts thereof according to a) further comprise aryl radicals.

17. Outside release agent according to claim 1, comprising 7.5% to 15% by wt. diatomaceous earth.

18. Outside release agent according to claim 1, comprising 1 to 3% by wt. pyrogenic hydrophobic silica.

19. Outside release agent according to claim 1, comprising 0.2 to 0.7% by wt. nonionic surfactant.

20. Outside release agent according to claim 1, comprising 0.4 to 2% by wt. binder.

21. Outside release agent according to claim 1, comprising 0.3 to 1% wt. dye.

22. Outside release agent according to claim 1, comprising 3 to 5% by wt. ethyl alcohol.

23. Outside release agent according to claim 1, comprising 45 to 90% by wt. water.

* * * * *